United States Patent Office 2,870,391
Patented Jan. 20, 1959

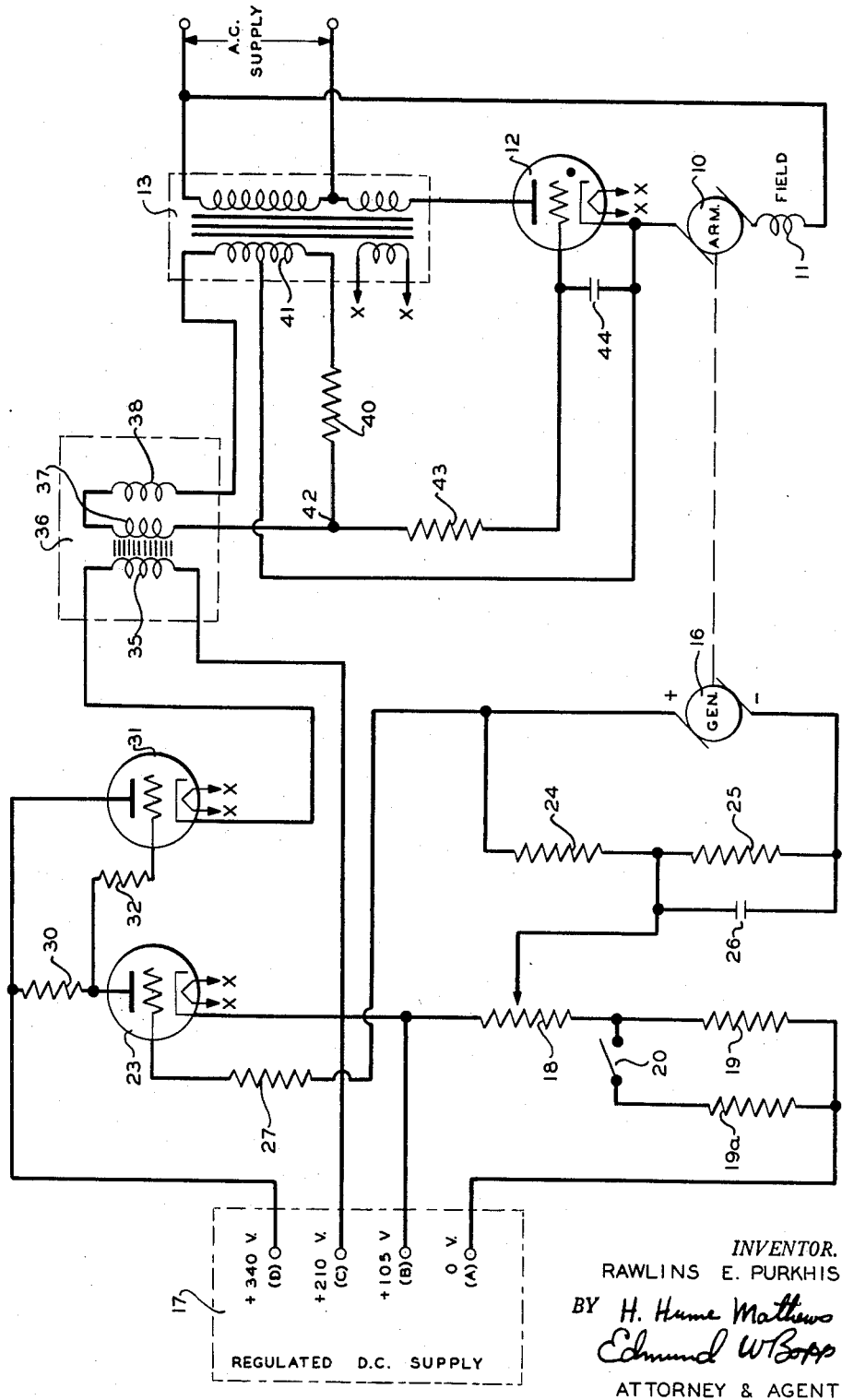

2,870,391

MOTOR SPEED CONTROL

Rawlins E. Purkhiser, Springfield, N. J., assignor to Air Reduction Company, Incorporated, New York, N. Y., a corporation of New York Application September 5, 1956, Serial No. 608,073

3 Claims. (Cl. 318—327)

This invention relates to methods and apparatus for controlling the speed of electric motors and more particularly to a wide range speed control for series motors.

Fractional horse power electric motors are widely used to power light machinery. In most instances, the motors are required to operate at one fixed speed with a constant or varying load or are required to be adjustable over a range of speeds under constant load conditions. Usually minor variations in speed are not particularly objectionable. There are however, certain applications in which the motor speed must be adjustable over a wide range and in which the motor speed must be maintained substantially constant at any point in the range even under conditions of varying load. Examples of this type of service are found in the welding and cutting industry. For instance, in electric arc welding with a consuming wire electrode the electrode wire may be fed by feed rolls, usually of the type known as pinch rolls, driven by such an electric motor. In this service, variations in the speed are critical because such variations result in a lengthening or shortening of the arc which may result in the formation of a defective weld. For wires of different sizes, and for wires of different materials it is necessary to employ different wire feed rates. The load on the wire feed motor is constantly changing as a result of variations in the frictional resistance to wire feeding and as a result of the changing radius of curvature of the wire as successive layers are withdrawn from the supply reel. Another instance in which it is highly desirable to have a motor and motor control that permits constant speed operation over a wide range of speeds is in the oxy-acetylene cutting industry in which the carriage moving the torch relative to the work must operate at a constant speed for satisfactory cutting and must be capable of operation over a wide range of speeds. Oxy-acetylene cutting speeds may vary over a very wide range depending on the thickness of the material to be cut, the composition of the material, and the size and type of cutting tip to be used. More recently high speed arc cutting processes have been introduced in which the cutting speeds range from some moderate speed to very high speeds. In each of these cutting processes it is essential that speeds be maintained constant during the cutting operation to obtain quality results. Furthermore it is desirable to have a single motorized carriage suitable for use with all cutting and welding processes.

The prior art has provided several electric motor controls designed to enable the motors to be operated over a range of speeds and designed to maintain the speed substantially constant at any setting within the range. Each of these however has had some inherent limitation keeping it from being wholly suitable for all applications. For example, there are available several electronic control systems for shunt motors. In each of these the shunt field is separately excited and the motor therefore has an electrically imposed "base speed" which for control purposes becomes the upper speed limit of the motor. To exceed this "base speed" elaborate controls are required to adjust both armature and field current. As a result all simple and inexpensive shunt motor controls are restricted to a relatively narrow range of speeds. In addition, in a shunt motor it is necessary to derate the motor for low speed operation. If this is not done excessive heating may occur because of the continued high level of heating from the field and the reduced cooling at low speed. This phenomenon therefore further tends to reduce the useful speed range of a shunt motor. At best existing shunt motor electronic controls provide a speed regulation of the order of from 0.5% to 5%. Series motors are more desirable for wide speed range use in that they can be satisfactorily operated at substantially uniform torque at all speeds and do not have any electrical upper speed limit. This, in effect, gives them a potentially greater operating range. Series motor controls of the prior art suitable for constant speed operation have been of the centrifugal type in which contacts in the motor circuit open and close as a result of the effects of centrifugal force in response to changes in speed to interrupt intermittently the flow of current to the motor to give it an average speed related to the particular setting of the centrifugal control. In this type of control the useful speed range is limited to about 10–1 and the regulation by comparison with the present invention is poor.

As used in this specification, speed regulation is defined as the reduction in speed from no load to full load at low speed divided by the maximum no-load speed. This is generally expressed as a percentage figure.

An object of the present invention therefore is to provide a series motor control permitting operation of the motor over a wide range of speeds.

Another object is to provide good speed regulation in a wide range speed control for series field motors.

These and other objects and advantages of the invention will be pointed out or will become apparent from the detailed description herein and the accompanying drawing of one embodiment of the invention.

According to the present invention a series motor is supplied from an alternating current supply line through a thyratron. A direct current generator, preferably of the permanent magnet type mechanically coupled to the motor armature shaft produces a signal voltage that is directly proportional to the armature speed. This signal is compared with a preselected regulated reference voltage to obtain a difference voltage which is amplified in a voltage amplifier circuit. The output of the voltage amplifier is applied to a cathode follower circuit which includes, as an impedance in the cathode circuit the D. C. winding of a saturable reactor. The A. C. winding of the reactor is in the thyratron grid control circuit. As the degree of saturation of the core varies in accordance with the deviation of the armature speed from the desired speed, the output of the phase shifting network, which includes the variable impedance of the saturable reactor, acts to vary the time during which the thyratron conducts and thereby vary the root means square (R. M. S.) value of current supplied to the series motor in a manner to maintain the motor speed constant.

The single figure of drawing illustrates schematically a circuit embodying the present invention for the control of a series field motor.

Referring to the drawing the motor is represented by the armature 10 and the field winding 11. Current is supplied to the motor through a gas filled grid controlled rectifier tube (thyratron) 12 from a transformer 13 connected across an A. C. supply line. In the particular embodiment illustrated the transformer has multiple windings and is connected as an auto transformer for the purpose of increasing the voltage applied to the motor and thyratron to a value above the line voltage. While such a connection in itself forms no part of the present invention it has been found useful to compensate for the reduction in the R. M. S. value of current supplied to the motor as a result of the half wave rectification of the current by tube 12. With this arrangement a standard 115 volt motor can be operated from a standard 115 volt supply line.

As is well known in thyratron controls an alternating voltage is applied across the plate and cathode of thyratron 12 and another alternating voltage is applied across the control grid and cathode. The tube becomes conductive when the plate is positive with respect to the cathode by more than some voltage known as the break down or ignition voltage. Conduction can be prevented from starting if the control grid is negative with respect to the cathode by more than some other voltage known as the critical grid voltage. In the particular embodiment of the present invention being described herein a Type C3J thyratron may be used. It is a characteristic of gas filled tubes that once conduction has begun the control grid loses control and conduction continues unimpeded, without regard to voltage changes on the grid, until the plate is no longer sufficiently positive with respect to the cathode to support conduction. Since the voltage applied to the thyratron is an alternating voltage conduction ceases each time the plate swings negative enabling the grid to regain control. It is obvious from this that by varying the phase of the alternating voltage applied to the grid with respect to that applied to the plate the length of time during each cycle that the tube conducts can be controlled. The output torque of the motor is directly related to the R. M. S. value of current therethrough. This in turn is related to the load and the conduction time. For a given load the speed can be increased or decreased by temporarily varying the conduction time until the desired speed be attained. In the present invention the novelty resides primarily in the manner in which the necessary phase shift is derived and applied in order to maintain substantially constant any preselected speed of the motor over a wide operating range.

In order to obtain a signal voltage that is directly proportional to motor speed a D. C. generator 16, preferably of the permanent magnet type, is mechanically coupled to the motor armature. A suitable generator for this use is a tachometer generator. The voltage produced by generator 16 is compared with a preselected constant voltage derived from a regulated D. C. power supply 17 of conventional design. This same power supply provides D. C. to several components of the circuit as will be more fully described hereinafter. By way of example only and without in any way limiting the disclosure, representative voltages at the various output taps of the power supply 17 have been indicated on the drawing. Thus a regulated voltage of 105 volts appears between taps (A) and (B). This voltage is divided by a voltage divider consisting basically of potentiometer 18 and resistor 19. An additional resistor 19a may be placed in parallel with resistor 19 to change the distribution of voltage across the voltage divider by closing switch 20. This, as will be obvious hereafter, gives the control two speed ranges.

The voltage at the variable tap of potentiometer 18, which voltage ultimately determines the motor speed, is compared with the voltage produced by generator 16 and the difference voltage is applied to the control grid of the vacuum tube 23 of a voltage amplifier circuit. The voltages are compared and the difference applied to the control grid of tube 23 as follows. The cathode of tube 23, which in this example may be one half of a type 12AT7 is tied electrically to tap B of the regulated power supply. Since the positive side of the voltage divider comprising potentiometer 18 and resistor 19 is also connected to tap B, the variable tap of potentiometer 18 is necessarily negative with respect to tap B. Inasmuch as the grid of tube 23 is electrically connected to the potentiometer variable tap the grid of tube 23 is also negative with respect to the tube cathode. This is in the absence of any current produced by generator 16. Generator 16 sets up a circulating current through resistors 24, 25 of such polarity that the voltage drop across resistor 24 as a result of this circulating current causes the grid to become more positive, thereby opposing the grid bias established by potentiometer 18. From this it may be seen that as the speed of motor armature 10 increases, the voltage drop across resistor 24 increases as a result of the increased output voltage of generator 16, and the grid of vacuum tube 23 becomes less negative with respect to its cathode. Conversely, as the speed of motor armature 10 decreases the control grid of tube 23 becomes more negative with respect to its cathode. Capacitor 26 across resistor 25 acts with resistors 24 and 25 to form a differentiating network to stabilize the system and prevent hunting in the circuit. Resistor 27 in the grid circuit of tube 23 acts to prevent the flow of excessive grid current.

The plate of tube 23 is connected to the high voltage tap D of the power supply 17 through a conventional plate load resistor 30. Voltage variations applied to the grid of tube 23 are amplified thereby and the output of this amplification stage is applied to the control grid of vacuum tube 31 through a current limiting resistor 32. Tube 31 may be the other half of the type 12AT7 used for tube 23. Tube 31 constitutes a part of a cathode follower circuit. Its plate is connected to the high voltage tap (D) of the regulated power supply 17 and its cathode is connected to tap (C) of the supply. The D. C. winding 35 of a saturable reactor 36 is connected in circuit with the cathode of tube 31. The current flowing through the D. C. winding 35 determines the degree of saturation of the core of the reactor which in turn determines the magnitude of the inductive reactance presented by the A. C. windings 37, 38 of the reactor. As saturation increases, inductance decreases. The A. C. windings 37, 38 of the saturable reactor are in a phase shifting network comprising the windings 37, 38 and the resistance 40 in a series connection across the output of the secondary winding 41 of transformer 13. A center tap of winding 41 is connected to the cathode of thyratron 12. A junction point 42 between the saturable reactor and resistor 40 in the phase shifting network is connected through a current limiting resistor 43 to the control grid of thyratron 12. Capacitor 44 protects the circuit against transient surges in the A. C. supply. By varying the inductive reactance in the phase shifting network the phase relation of the voltage applied to the thyratron grid can be shifted with respect to the voltage applied to the plate and the conduction time of the tube thereby controlled in the conventional manner.

From the above it may be seen that for any given setting of potentiometer 18, there will be some equilibrium speed attained by the motor. Speeds above the equilibrium cause the grid of tube 23 to be less negative than normal which ultimately causes less current than normal to flow in D. C. winding 35 of saturable reactor 36. This increases the inductive reactance in the phase shifting network shifting the voltage applied to the grid of thyratron 12 in a direction to delay the firing of thyratron 12 and thereby reduce the output torque and slow down the motor. By the same reasoning the motor speed automatically increases if it is too low for the particular setting of potentiometer 18.

A second range of motor speeds may be provided by producing a redistribution of voltage in the reference voltage divider by closing switch 20 and introducing resistor 19a into the circuit. This reduces the voltage at the movable tap of the potentiometer and thereby provides a higher motor speed for each potentiometer setting.

As previously pointed out the novel motor control disclosed herein is superior to those of the prior art in two principal respects. It has a wider useful speed range and it provides better speed regulation.

The wider useful speed range stems primarily from being able to use a series field motor to advantage. Such a motor is capable of operation over a wide speed range with substantially uniform useful torque through the range if the motor excitation can be satisfactorily controlled through such a range. The present invention provides such control of the motor excitation for the first time.

The excellent speed regulation provided by this control is the cumulative result of several factors. It is believed that the use of a permanent magnet generator directly coupled to the armature shaft produces a more accurate and useable motor speed signal than, for instance, armature voltage or centrifugal force. It is necessary, if the benefits of the accurate signal are to be fully utilized, to amplify the error voltage produced from it in a linear amplifier. Because the system is designed to control the motor speed over a wide range and with varying loads it is necessary that the current in the D. C. winding of the saturable reactor be capable of variation over a relatively wide range. The use of a voltage amplifier followed by a cathode follower power amplifier provides a system capable of producing wide variations in current in the D. C. winding of the saturable reactor with simple circuitry and relatively inexpensive and readily available components while at the same time maintaining the necessary linearity. Satisfactory results can not be obtained by following the conventional practice of placing the reactor winding in the plate circuit of a vacuum tube. With the current demands of this control any system having the reactor winding in the plate circuit would cause the tube to operate well outside the linear portion of its characteristic curve. As a result speed correction would be impaired and poor regulation would necessarily result. Because the signal generating and amplifying system provides the necessary range and linearity the phase shifting network can be simple and free from circuit additives that might otherwise be necessary to compensate for other shortcomings of the system.

It has been found that with the present invention the motor can be operated at all loads over a speed range of 100 to 1 or more. This compares with prior art devices having a useful range of the order of 10 to 1 or less. Speed regulation calculated as $$\frac{\text{Speed drop from no load to full load at low speed}}{\text{Maximum no load speed}}$$

and expressed as a percentage is for the present invention of the order of 0.15%. This is as compared with 0.5% to 5% for the best prior art devices.

As a typical example of the present invention a ⅛ horsepower series field motor may be controlled by a system as above described over a useable range of from 100 to 10,000 R. P. M. Tubes 23 and 31 may be the two halves of a dual triode of type 12AT7. Over the desired operating range the voltage output of the tachometer generator 16 varies from .70 to 70 volts. Throughout the speed range and for all reasonable loading conditions the voltage amplifier tube 23 operates well within the linear characteristic range. Current varies in the D. C. winding of the saturable reactor from 0 to about 10 milliamperes. The A. C. supply from which transformer 13 is fed may be a conventional 115 volt 60 cycle A. C. lighting circuit.

Repeated reference has been made throughout this specification to the application of the invention to fractional horsepower motors. While this may well be the field in which the invention will be most widely used it is not limited thereto and can be applied equally well to larger motors.

While only one embodiment of the invention has been shown and described herein, it is to be understood that the invention is not limited to the particular form shown but may be used in other ways without departure from its spirit as defined by the following claims.

I claim:

1. In a speed control for a series field electric motor in which the armature and field windings of said motor are connected in series with a gas filled grid controlled rectifier tube across a source of alternating current, and in which an alternating voltage derived from the same alternating current source is applied to the control grid of said tube, the improvement which comprises shifting the phase of the voltage applied to the control grid of said tube by means of a phase shifting network including a saturable reactor having its saturating winding in a cathode follower circuit including a grid controlled vacuum tube which has applied to the grid thereof a signal derived from the speed of rotation of said motor.

2. Apparatus for maintaining the speed of a series field motor substantially constant comprising a source of alternating current, a grid controlled gas filled rectifier in series with the armature and field windings of said motor, means for energizing said series connected rectifier, armature and field from said source, a source of reference voltage, a source of signal voltage directly related to the speed of said motor, means for comparing said reference voltage and said signal voltage to produce an error voltage, means for amplifying said error voltage, a cathode follower circuit responsive to said amplified error voltage adapted to control the degree of saturation of the core of a saturable reactor, means for applying an alternating voltage derived from said source of alternating current across the control grid and cathode of said grid controlled gas filled rectifier, and means for shifting the phase of said alternating voltage in response to the degree of saturation of said reactor core to thereby control the electrical input to said motor armature and field to maintain said motor speed substantially constant.

3. A variable speed control for constant speed operation of a series field motor comprising a source of alternating current, a grid controlled gas filled rectifier in series with the armature and field of said motor, means for energizing said series connected rectifier, armature, and field from said source, a direct current generator mechanically coupled to the armature of said motor, means for comparing the output voltage of said generator with a preselected reference voltage to develop therefrom a difference voltage, means for applying the difference voltage to the control grid of a vacuum tube in a voltage amplifier circuit, means for applying the output of said voltage amplifier to the control grid of a grid controlled vacuum tube in a cathode follower circuit, a saturable reactor having a direct current winding in the cathode circuit of said cathode follower tube and an alternating current winding in a phase shifting network energized from said alternating current source, and means for applying the output of said phase shifting network across the control grid and cathode of said gas filled rectifier to control the period of conduction of said gas filled rectifier whereby the electrical input to said series connected armature and field winding is regulated to maintain the motor speed substantially constant.

References Cited in the file of this patent

UNITED STATES PATENTS

| | | |
|---|---|---|
| 1,985,003 | Von Engel et al. | Dec. 18, 1934 |
| 2,653,288 | Kubler | Sept. 22, 1953 |
| 2,656,500 | Dee | Oct. 20, 1953 |
| 2,733,395 | Brown | Jan. 31, 1956 |